United States Patent [19]

Janhila

[11] Patent Number: 5,956,633
[45] Date of Patent: *Sep. 21, 1999

[54] METHOD AND APPARATUS FOR CONTROLLING THE RIGHT OF USE/ACTIVATING OF A MOBILE STATION WHICH USES AT LEAST TWO PREDEFINED CODES WHICH ARE PRE-STORED IN A SIM MODULE

[75] Inventor: Pertti Janhila, Salo, Finland

[73] Assignee: Nokia Mobile Phones Limited, Salo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/665,790

[22] Filed: Jun. 18, 1996

[30] Foreign Application Priority Data

Jun. 19, 1995 [FI] Finland ..................................... 953026

[51] Int. Cl.⁶ ..................................................... H04B 1/10
[52] U.S. Cl. ........................... 455/410; 455/411; 455/558
[58] Field of Search ..................................... 455/432, 435, 455/552, 558, 551, 410, 411, 575; 380/23

[56] References Cited

U.S. PATENT DOCUMENTS

| | | | |
|---|---|---|---|
| 4,868,846 | 9/1989 | Kemppi | 379/144 |
| 5,060,266 | 10/1991 | Dent | 380/49 |
| 5,091,942 | 2/1992 | Dent | 380/46 |
| 5,148,485 | 9/1992 | Dent | 380/46 |
| 5,237,612 | 8/1993 | Raith | 380/23 |
| 5,241,598 | 8/1993 | Raith | 380/21 |
| 5,266,782 | 11/1993 | Alanara et al. | 235/380 |
| 5,315,638 | 5/1994 | Mukari | 379/58 |
| 5,353,328 | 10/1994 | Jokimies | 379/58 |
| 5,392,356 | 2/1995 | Konno et al. | 380/23 |
| 5,448,622 | 9/1995 | Huttunen | 379/58 |
| 5,487,084 | 1/1996 | Lindholm | 375/215 |
| 5,557,654 | 9/1996 | Maenpaa | 379/58 |

FOREIGN PATENT DOCUMENTS

| | | |
|---|---|---|
| 0 607 767 A1 | 7/1994 | European Pat. Off. . |
| 0 652 681 A2 | 5/1995 | European Pat. Off. . |
| WO 95/01695 | 1/1995 | WIPO . |

*Primary Examiner*—Douglas W. Olms
*Assistant Examiner*—David R Vincent
*Attorney, Agent, or Firm*—Perman & Green, LLP

[57] ABSTRACT

The present invention concerns a method and apparatus for restricting the right of use of a mobile station, for example, to a communications network controlled by a certain operator. The mobile station is locked so that it can be used only with a SIM module (21) having a certain code (IMSI, GID1, GID2), and the lock can be opened with a lock open password ($C_1$) given by the network operator, the password being compared in the mobile station with a comparative password ($C_2$). In the method and apparatus according to the invention the lock open comparative password ($C_2$) is calculated in the mobile station by an algorithm (X, Y) stored in the mobile station, input data for the algorithm being preferably an equipment table ($T_1$), a mobile equipment identity code (IMEI), and an operator specific code N, all stored in the mobile station. Correspondingly, the operator calculates the lock open password ($C_1$) with a device that preferably includes a protection module. The lock open password calculation algorithm has as input data an operator table, the mobile equipment identity code (IMEI), and the protection code of the protection module. In accordance with the present invention the lock open password ($C_1$) can be made operator specific, and no unauthorized person can obtain the password by reading it from the memory of the mobile station, or through the program used by the operator.

19 Claims, 3 Drawing Sheets

METHOD AND APPARATUS FOR CONTROLLING THE RIGHT OF USE/ ACTIVATING OF A MOBILE STATION WHICH USES AT LEAST TWO PREDEFINED CODES WHICH ARE PRE-STORED IN A SIM MODULE

FIELD OF THE INVENTION

The present invention concerns a method, an equipment, and a system for restricting the right of use of a mobile station to, by example, a telecommunication network controlled by a certain operator.

BACKGROUND OF THE INVENTION

Digital mobile stations are generally provided with a mobile station specific equipment identity code saved permanently in the mobile station and with an operator/customer specific user code saved in a memory card or a smart card. In mobile communications systems the rights of use of mobile phone users connected to a telecommunication network and the utilization rate of the network must be controlled because of the invoicing relating to the use of the telecommunication network. This control is implemented with the help of codes defined for the users and the operators of the telecommunication network. In addition to the rights of the users, also the right of a mobile station to be used in the network has to be controlled so as to prevent the use of stolen mobile stations and those found to be defective. This has been arranged with a mobile equipment identity code.

The use of a digital mobile station can be restricted to a telecommunication network of a certain operator only. Thus, it is possible to make agreements between the user of the mobile station and the operator, according to which the mobile station is owned by the operator or the purchase cost of the mobile station is compensated to the customer by the operator, in which cases it is in the operator's interest to restrict the use of the mobile station to the operator's own network only. This function is also based on the use of the above mentioned codes.

In the following description the control of the right of use of a mobile station will be exemplified in the GSM system (Global System for Mobile Communications). The GSM system has been described in more detail in the following publication: [1] M. Mouly, M-B. Pautet: The GSM System for Mobile Communications, 1992. In the GSM system the International Mobile Equipment Identity code IMEI is saved in the permanent memory of the mobile station when manufacturing the device. The code includes a Type Approval Code TAC, a Final Assembly Code FAC and a serial number. The code is for each mobile station individually unique. When starting a communication or during it, the data transmission network can request the IMEI code of the mobile station and compare it with a register of authorized and/or unauthorized mobile stations. The IMEI code is used, for example, for preventing the use of stolen or defective mobile stations.

In the GSM system the codes relative to the operator and the user of the telecommunication network have been stored in the so called SIM module (Subscriber Identity Module). The SIM module is generally a part of a so called SIM card having an electric coupling for attaching the card to the mobile station. The SIM module includes, by example, the information required for the communication concerning the user, the telecommunication network to be used, and the encryption of the radio data transmission. The SIM module includes also the customer's invoicing data to be transferred to the telecommunication network simultaneously with the call from the mobile station. In this way the user can use the SIM card as needed in different mobile stations, unless the use of the mobile station is restricted, for example, so that the mobile station can be used only if a SIM card of a certain operator is inserted into it. If the use of the mobile station or some of its features is restricted in the above mentioned way, the restriction will be implemented with codes stored in the SIM module.

In the following the "lock closing" of the mobile station means a function where the use of some or all of the features of the mobile station requires that the certain data saved in the mobile station and in the SIM module are identical. Correspondingly, the "lock opening" means that the lock in question is removed. A mobile station is usually locked when it is sold, so that the user makes an agreement with the operator of a certain telecommunication network. In that case a lock closing parameter, which is a predefined field to be read from the SIM module, is saved in the memory of the mobile station. Codes generally used for the lock closing are the so called International Mobile Subscriber Identity code IMSI, and two so called Group Identification Level codes GID1 and GID2. The IMSI code saved in the SIM module consists of an operator specific part and a card specific part. The length of the IMSI code is 15 digits, in which the operator identification part consists of 5 digits. The mentioned two group identification levels GID1 and GID2 are meant as special codes of the operator, service provider, or customer, and they can be programmed into the mobile station only by the operator. Both group identification levels consist of e.g. two bytes. Neither the IMSI code of the SIM module nor the contents of the group identification levels can be changed after being saved.

The user of the mobile station can open the lock of the mobile station by inputting to the mobile station the lock open password given by the operator. The mobile station then compares the entered lock open password with the comparative password saved in the permanent memory of the mobile station, and if the passwords are identical the processor of the mobile station opens the lock. The operator calculates the above-mentioned mobile station specific lock open password with a calculation program.

There are several problems relating to the known lock closing methods concerning the lock opening. If one and the same lock open password calculation method is used, regardless of the operator, it is possible, by using the same lock open password calculation program, to find out the lock open passwords of mobile stations connected to networks of all operators.

Another known solution is to use an operator specific lock open password calculation program, whereby the above-mentioned problem is avoided. In this case it is not possible, however, to save comparative passwords to the mobile stations when manufacturing, and they have to be instead programmed when connecting the mobile station to a certain operator's network. This causes extra work for the sales organization, as well as the need to invest in numerous programming devices. Further, the contents of the memory can be read after programming, which increases the risk of unauthorized lock opening.

A third possibility is to program every operator's data to each mobile station during manufacture. The problem with this solution is, however, that there are a large number of operators and thus the permanent memory required for saving the data in the mobile station would have to be unreasonably large. Further, the memory requirement will increase if every operator uses several different locking levels by which the mobile station can be locked to alternative codes of the SIM module. Also, new operators can come on the market, in which case only mobile stations that are manufactured after the codes for the respective operators have been agreed, could be connected to the networks of the new operators. That would create problems in marketing, as there would be many versions of devices.

SUMMARY OF THE INVENTION

An object of the present invention is to provide a method and an equipment for an operator specific locking system, wherein the above-mentioned problems relating to the prior art technology are avoided.

One important aspect of the invention is that the comparative password that is needed for checking the lock open password entered into the mobile station when opening the lock is not permanently saved in the mobile station, but is calculated in the mobile station according to a predefined code table and rule, e.g. when the lock is opened. Correspondingly, the operator also calculates the lock open password to be entered into the mobile station according to a predefined code table and rule.

The solution in accordance with the present invention has several advantages compared with the solutions known so far. First, the protection level of the mobile station is improved because the lock open password cannot be read from the memory in order to break the lock. Secondly, the size of the memory needed for locking in the mobile station is small, because the locking data and programs stored in the mobile station when manufacturing are independent of the number of operators. Also, it is not necessary to make changes to the mobile stations because of new operators. In addition, the operators can use the lock open password calculation program without any risk of misuse, because the lock open passwords are operator specific. For the password calculation also a separate protection module is available, further decreasing the risk of misuse.

One characteristic of a method in accordance with the invention is that the comparative password ($C_1$) is calculated in the mobile station on the basis of a predefined code (IMEI, N) stored in the mobile station. A further characteristic of the mobile station in accordance with the invention is that the mobile station has circuits (23, 24) for saving the predefined code (N, IMEI) and circuits (20) for calculating the comparative password ($C_2$) on the basis of the predefined code (N, IMEI). A characteristic of the system in accordance with the invention is that the predefined code (IMEI) and a second algorithm (Y) are saved in the mobile station and in the lock open password calculation device (36), and the comparative password ($C_2$) is calculated in the mobile station and the lock open password ($C_1$) is calculated in the lock open password calculation device (36) with help of the predefined second algorithm (Y) on the basis of the code (IMEI).

BRIEF DESCRIPTION OF THE DRAWINGS

In the following section the invention is described with reference to the enclosed drawings, where.

DETAILED DESCRIPTION OF THE INVENTION

The invention will be described in more detail in the following with help of one embodiment relating to the GSM system. Firstly, one procedure in accordance with the invention for locking the mobile station and a respective procedure for opening the lock with the help of the lock open password will be described, with reference to FIGS. 1 and 2. After that, one system in accordance with the invention and a respective lock open calculation device will be described with reference to FIGS. 3 and 4.

The mobile station can be locked to alternative locking parameters, in other words, alternative locking levels can be used (in claims termed "dependence identifying code L"). The locking can be implemented, for example, by the following locking levels:

locking to SIM modules of a certain operator, the locking parameter being the operator specific part of the IMSI code, locking to a certain service supplier, the locking parameter being the GID1 part, locking to the use of a certain company, the locking parameter being the GID2 part, or locking to a specified SIM module, the locking parameter being the IMSI code as a whole.

Also combinations of the above-mentioned locking levels can be used.

Figure 2:
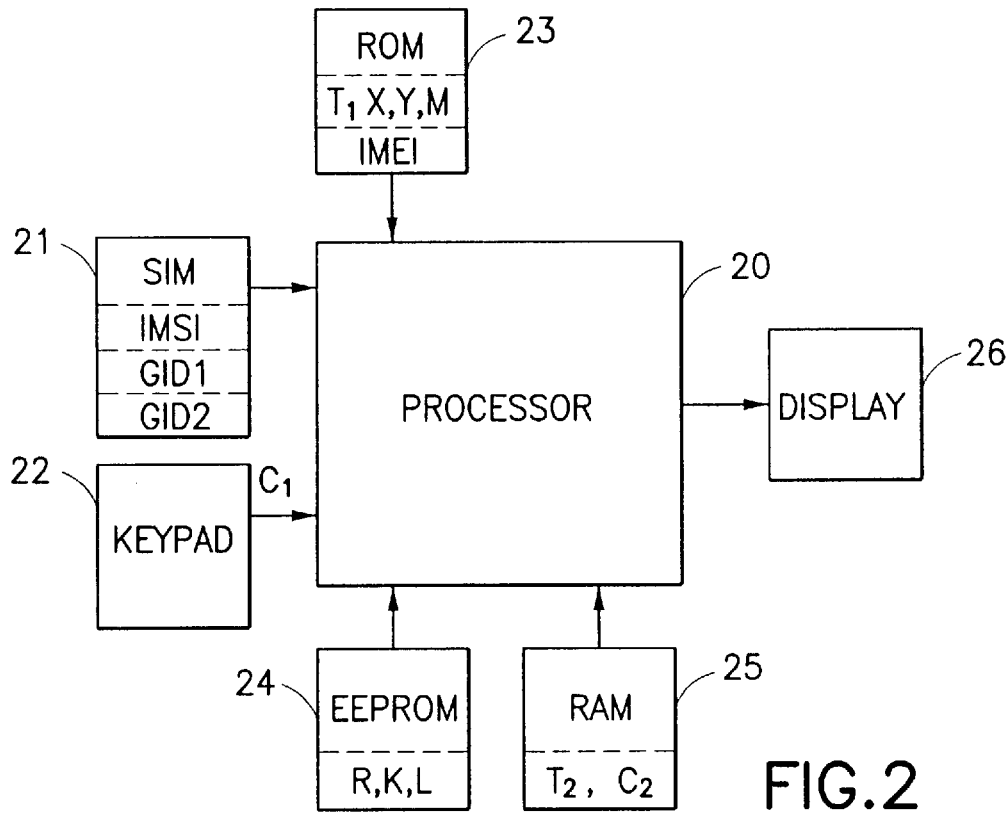
FIG. 2 illustrates a block diagram of the construction of the identifying part of one mobile station in accordance with the invention.

FIG. 2 illustrates the construction of the identifying part of a mobile station in accordance with the present invention, including an erasable memory 24, where the information R relating to the lock closing, preferably the following, will be saved:

lock status, for example, "closed" or "open", information specifying the locking parameters to which the mobile station is locked and that will be checked when using the mobile station, IMSI code or a portion thereof including operator identification data consisting of the first 5 digits and a portion or all of the remainder of the 10 digits of the IMSI code if included in the locking parameters, group identification, if included in the locking parameters;

for example, 2 bytes for identifier GID1 and/or for example, 2 bytes for identifier GID2, lock open password entry counter for indicating a number of entry attempts remaining (for example, 1 digit), and operator's algorithm configuration data (for example, 1 digit).

The operator's configuration data K consists of, for example, one digit, the default value of which is preferably zero. With this parameter the comparative password calculated by the mobile station can be changed.

The above-mentioned data is saved to or stored within the erasable memory 24 of the mobile station together with protection data of the mobile station, so that the data cannot be directly read from the memory. When reading the data, a conversion algorithm is used, to which, in addition to the above-mentioned lock information, also the IMEI code of the mobile station is given as input data. For providing the lock opening technique according to the invention, an equipment table $T_1$ and comparative password calculation algorithms X and Y are saved to the permanent memory 23 of the mobile station. The configuration data K, the equipment table $T_1$ and the calculation algorithms X and Y are described in more detail later in connection with the description of the lock open procedure.

The mobile station will be locked either by connecting a PC to the mobile station and giving the needed commands to the processor 20 of the mobile station, or by entering the needed code for the lock closing through the keypad 22 of the mobile station. When locking the mobile station with a command through the keypad 22, the SIM module 21 must be inserted into the mobile station, whereupon the mobile station reads from the SIM module 21 the values of the fields to be used as lock closing parameters. The lock can also be closed automatically when the first SIM module is inserted to the mobile station. In this case it is preferable, however, that the lock closing requires, for example, an acceptance through the keypad 22, so that the lock of the mobile station would not be closed on the basis of parameters of a wrong SIM module.

The lock of the mobile station can be closed, for example, by the manufacturer or vendor of the mobile station, or by the network operator. When needed, the mobile station can also be programmed so that the lock closing is prevented, if locking of the mobile station to a certain network is not allowed in some communications area.

Figure 1:
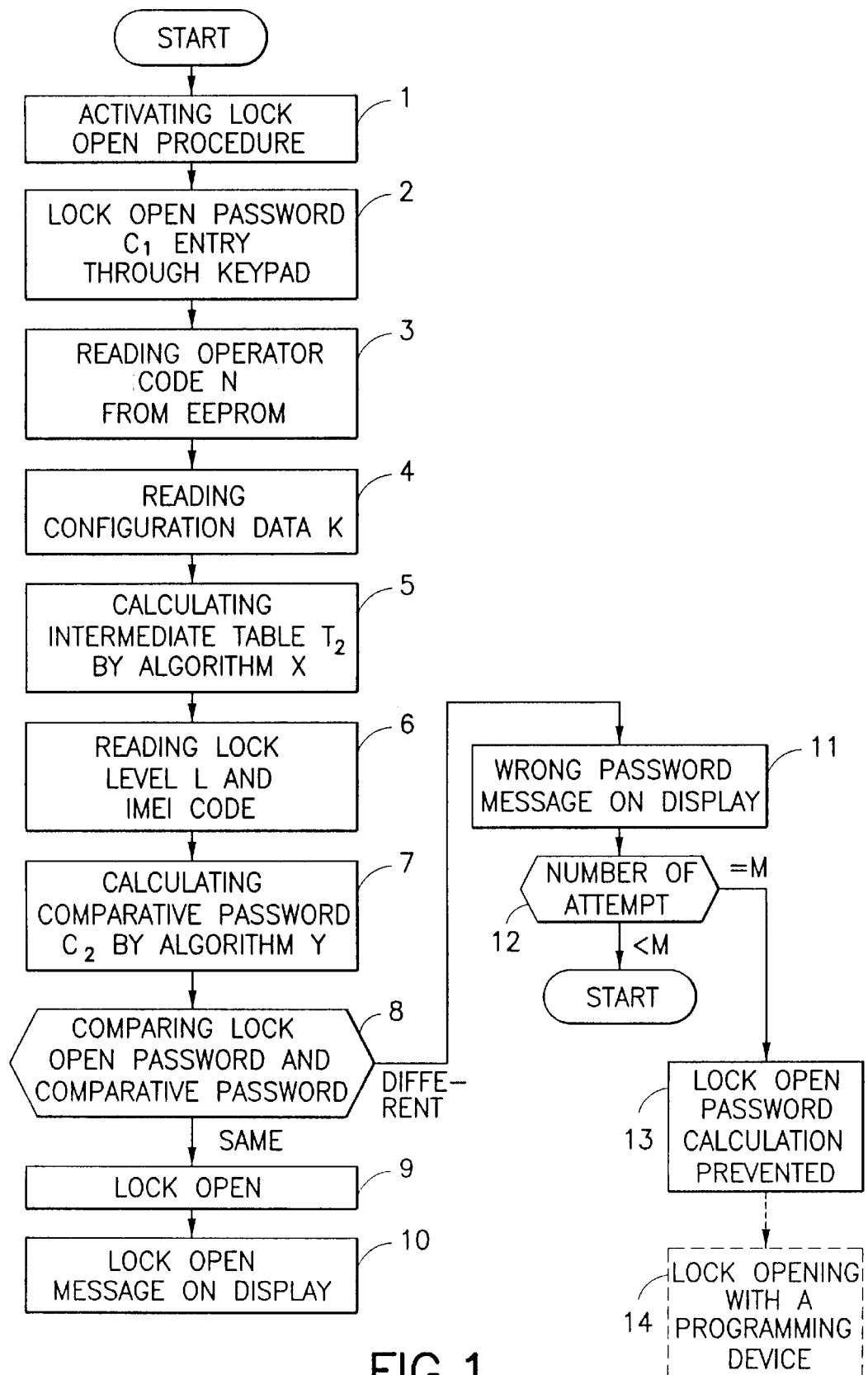
FIG. 1 illustrates a flow diagram of an embodiment of the lock open procedure in accordance with the present invention.

FIG. 1 illustrates as a flow diagram one lock open procedure of the mobile station in accordance with the invention. FIG. 2 illustrates those parts of the mobile station that are used for lock opening.

The lock open procedure is activated in the mobile station (phase 1), for example, through the keypad 22, whereupon a lock open password $C_1$ given by the operator is entered through the keypad (phase 2). If a SIM card 21 with no right of use of the mobile station is inserted, the mobile station can also ask the user of the mobile station to give open password $C_1$ needed for opening the lock.

The equipment table $T_1$ and the operator code N that belongs to the lock closing information R have been saved to the permanent memory 23 and erasable memory 24 of the mobile station, respectively. The processor 20 reads this data in phase 3. In addition, the processor 20 reads the configuration data K from the erasable memory 24 (phase 4). After this, the processor 20 calculates the intermediate table $T_2$ by algorithm X, by using the equipment table $T_1$, operator code N, and configuration data K as input data (phase 5). The intermediate table $T_2$ is saved to the intermediate memory 25.

After this the IMEI code and the locking level L are read from the permanent memory 23 and the erasable memory 24 of the mobile station, respectively (phase 6). On the basis of the read IMEI code and the intermediate table $T_2$ the processor 20 calculates the comparative password $C_2$ by the second algorithm Y (phase 7). Further, the processor compares the lock open password $C_1$ entered through the keypad 22 with the calculated comparative password $C_2$ (phase 8), and if the passwords are the same, the processor 20 opens the lock (phase 9) and outputs a message about the performed operation on the display 26 of the mobile station (phase 10).

If the lock open password $C_1$ and the comparative password $C_2$ are not identical, the processor 20 outputs a message about the incorrect password on the display 26 of the mobile station (phase 11). The processor 20 follows the number of performed lock open attempts and compares it with a maximum number of attempts M saved to the permanent memory 23 of the mobile station, which can be for example, 5 attempts (phase 12). If less lock open attempts have been used than the predefined maximum number of lock open attempts M, it is possible to try to open the lock again by repeating the mentioned steps. But if the maximum number of lock open attempts have been used, the processor 20 does not start a new opening process according to the described procedure (phase 13), but the opening has to be performed instead by the operator, for example, by using a programming device (phase 14). Preferably the same device and program are used for this purpose as for defining the lock open password of the mobile station, whereby the operator can perform both activities with the same device.

The permanent memory 23 of the mobile station can be implemented, for example, with a ROM (Read only Memory) circuit. The configuration data K, the locking level L, and the operator code N can preferably be saved to the erasable memory 24, which can be, for example, an EEPROM (Electrically Erasable Programmable Read Only Memory) circuit, where the data can be changed with an external programming device without opening the mobile station. The intermediate memory 25 is preferably arranged with electric RAM circuits (Random Access Memory), or with the internal memory of the processor. The memory and processor circuits are preferably the same circuits that are used for the other control operations of the mobile station. The calculation with the algorithms is preferably performed with the processor 20 of the mobile station, or alternatively with an ASIC circuit configured for that purpose.

The equipment table $T_1$ and the intermediate table $T_2$ can be, for example, 100 decimal digits. The larger the table, the better protection level is reached. However, it is not necessary to use all the numbers of the table for calculating the comparative password, but it is important that the selection of the numbers to be used and the algorithms are predefined. The intermediate table $T_2$ and the equipment table $T_1$ can be of the same or different size. The configuration data K and the locking level L can be, for example, parameters of one digit. The lock open password $C_1$ and the comparative password $C_2$ can be a sequence of, for example, 10 digits.

An aspect of the calculation algorithms is that the calculation result is dependent on all input parameters. The algorithms X and Y can include, by example, logical operations or arithmetic matrix operations like summation or multiplication. Most simply the algorithm X can be, by example, a multiplication of the table matrix $T_1$, configuration data K, and the operator code N, from the result matrix of which the predefined numbers are taken to the table $T_2$. Correspondingly, the algorithm Y can be a multiplication of the table matrix $T_2$, the equipment identity code IMEI, and the locking level L, from the result matrix of which the predefined numbers are selected to the comparative password $C_2$.

Figure 3:
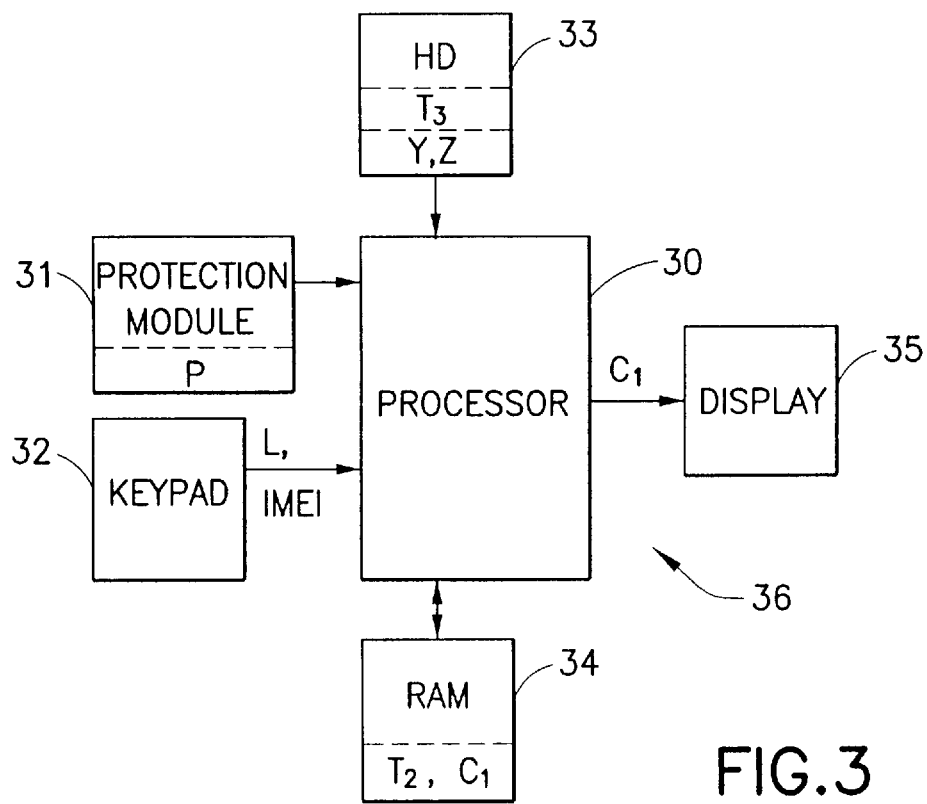
FIG. 3 illustrates the construction of one lock open password calculation device in accordance with the present invention.
Figure 4:
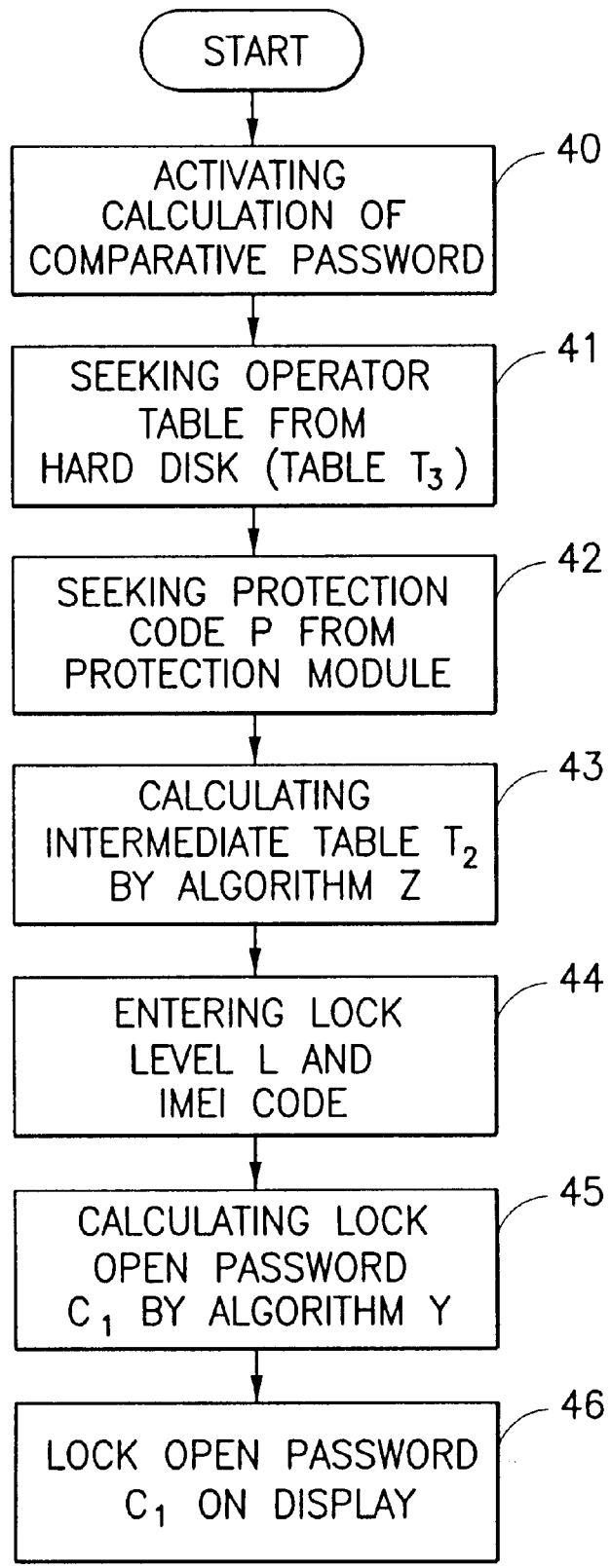
FIG. 4 illustrates a flow diagram of an embodiment for the lock open password calculation in accordance with the present invention.

FIG. 3 illustrates one lock open password calculation device 36 in accordance with the present invention and FIG. 4 illustrates as a flow diagram the calculation procedure of the lock open password. The lock open password calculation procedure in the lock open password calculation device 36 is activated (phase 40), whereby the processor 30 seeks the operator table $T_3$ from a hard drive 33 (phase 41). The device is equipped with a protection module 31, where the protection code P is read (phase 42). After that the processor 30 calculates, on the basis of the table $T_3$ and the protection code P an intermediate table $T_2$ by algorithm Z, that has been saved in, by example, the hard disk 33 (phase 43). The intermediate table $T_2$ is saved to the intermediate memory 34. After this the equipment identity code IMEI and the eventually used locking level L are entered through the keypad 32 to the processor 30 (phase 44). On the basis of these parameters (IMEI, L and the operator table $T_2$) the lock open password $C_1$ is calculated by algorithm Y saved to the hard disk 33 (phase 45). The thus calculated lock open password $C_1$ is shown on the display 35 (phase 46).

The device 36 is preferably protected against unauthorized use. The device 36 is thus provided with the protection module 31, that cannot be easily copied, and the code P which is essential for the operation of the program of the device. If the data of the protection module and the program, however, are discovered by unauthorized people, a new program configuration with respective protection module 31 can be delivered to the operator, after which the configuration data K corresponding to the new configuration can be programmed to the erasable memory of new mobile stations. If necessary, the configuration data can also be changed with a programming device to the mobile stations already in use, but in that case the existing locks of the mobile stations have to be opened first.

The lock open password calculation device is preferably implemented, for example, with a microcomputer, to a serial or parallel port of which the protection module 31 is connected. The protection module can be, by example, a processor equipped with a permanent memory.

The operator table $T_3$ of the lock open password calculation device can include, by example, 100 decimal digits. The protection code P can be, by example, a sequence of 10 digits. The algorithm Z can be an algorithm of the same type as the algorithms X and Y.

Number codes and tables containing numbers were used in the described embodiments of the mobile station and the lock open password calculation device, but any other characters can be used instead of numbers.

Most simply, the lock closing of a mobile station means preventing the use of a mobile station, if the locking parameter read from the SIM module is not correct. In connection with the method also other kinds of dependencies can be used, for example, so that only a certain operation of the mobile station requires that a SIM module with a correct locking parameter is inserted to the mobile station.

In the embodiment described above the lock opening is subject to identity of the lock open password and the comparative password. An aspect of the method is that the passwords are compared and the lock opening is dependent on the result of the comparison.

In the embodiment described above the calculation of the comparative password is implemented by using two algorithms and the comparative password is arranged to be dependent on the equipment table $T_1$, the equipment identity code IMEI, the operator code N, and the configuration data K. According to the present invention it is, however, possible to use for the calculation of the password also other algorithms, only a part of above-mentioned parameters, and possibly other additional parameters. Also, the intermediate table is not necessary, or there may be several of them.

Correspondingly, in the lock open password calculation device an arbitrary number of algorithms, only a part of the mentioned parameters, and possibly other additional parameters can be used.

Thus, although several embodiments of the present invention have been described in the foregoing, various modifications of the principles according to the invention can be made within the scope of protection of the claims, such as details of the implementation and the ranges of use.

Furthermore, and although the present invention has been described in the foregoing examples in the context of a GSM network, the invention is as well applicable in other mobile communications systems such as the DCS1800 or DCS1900 systems. Correspondingly, instead of the mentioned codes used in the GSM system, other codes can be used.

What is claimed is:

1. A method for activating a first activity in a mobile station, in which method a lock open password ($C_1$) is entered into the mobile station and compared with a predefined comparative password ($C_2$), said first activity being activated depending on the result of said comparison, wherein said first activity is comprised of a change of a right of use of at least one second activity in the mobile station, wherein said comparative password ($C_2$) is calculated in the mobile station on the basis of at least two predefined codes that are pre-stored in a memory that is accessible to the mobile station at least for read access, without being transferred over the air from a telecommunication network.

2. A method in accordance with claim 1, wherein a first code table ($T_1$) is also stored in the memory and said comparative password ($C_2$) is calculated in the mobile station also on the basis of the first code table ($T_1$).

3. A method in accordance with claim 1, wherein said change of the right of use of the second activity is made depending on a result of the comparison.

4. A method in accordance with claim 1, wherein said at least one second activity of the mobile station is dependent on identification data read from an identification means that is readably coupled to the mobile station, and wherein the change of dependence of said second activity on said identification data is made depending on the result of said comparison.

5. A method in accordance with claim 1, wherein one of said at least two predefined codes is comprised of a mobile equipment identity code (IMEI).

6. A method in accordance with claim 1, wherein one of said at least two predefined codes is comprised of an operator code (N) identifying a telecommunication network.

7. A method in accordance with claim 2, wherein said comparative password ($C_2$) is calculated by using a first algorithm (X) and a second algorithm (Y), wherein a second code table ($T_2$) is formed by the first algorithm (X) as a function of said first code table ($T_1$) and an operator code (N), said comparative password ($C_2$) being formed by the second algorithm (Y) as function of said second code table ($T_2$) and an equipment identity code (IMEI), wherein said codes N and IMEI comprise said at least two predefined codes that are pre-stored in said memory.

8. A method in accordance with claim 7, wherein at least one second activity of the mobile station is dependent on identification data read from an identification means that is readably coupled to the mobile station, and wherein a dependence between the mobile station and the identification data read from the identification means is defined with a dependence identifying code (L) that is stored in the mobile station, the comparative password ($C_2$) being dependent also on said dependence identifying code (L) by the second algorithm (Y).

9. A method in accordance with claim 7, wherein configuration data (K) is stored in the mobile station, and said second code table ($T_2$) is, arranged to be dependent also on the configuration data (K) by said first algorithm (X).

10. A mobile station comprising means for entering a lock open password ($C_1$), means for storing the lock open password ($C_1$) and a comparative password ($C_2$), means for making a comparison between the lock open password ($C_1$) and the comparative password ($C_2$), and means for activating a first activity in the mobile station on the basis of said comparison, wherein said first activity is comprised of a change of a right of use of at least one second activity in the mobile station, said mobile station further comprising means for operating on at least two predefined codes that are pre-stored in a memory that is accessible to the mobile station at least for read access, without being transferred over the air from a telecommunication network, and means for calculating said comparative password ($C_2$) on the basis of said at least two predefined codes.

11. A mobile station in accordance with claim 10, wherein said mobile station further comprises means for also storing a first code table ($T_1$) and means for calculating said comparative password ($C_2$) also on the basis of said first code table ($T_1$).

12. A mobile station in accordance with claim 10, wherein said mobile station is further comprised of identification means including identification data, wherein said at least one second activity of the mobile station is arranged to be dependent on said identification data, and wherein the activating means of the first activity is arranged to activate a change of dependence of the second activity on said identification data on the basis of said comparison.

13. A mobile station in accordance with claim 10, wherein one of said at least two predefined codes is comprised of a mobile equipment identity code (IMEI).

14. A mobile station in accordance with claim 10, wherein one of said at least two predefined codes is comprised of an operator code (N) identifying a telecommunication network.

15. A mobile station in accordance with claim 12, wherein said mobile station further comprises a dependence identifying code (L), wherein a dependence between the activity of the mobile station and identification data read from an identification means is defined by the code (L) identifying said dependence, wherein the mobile station further comprises means for storing the dependence identifying code (L) and means for calculating the comparative password ($C_2$) also on the basis of said dependence identifying code (L).

16. A mobile station in accordance with claim 10, wherein said mobile station is further comprised of means for storing configuration data and means for calculating said comparative password ($C_2$) also on the basis of said configuration data.

17. A system comprising at least one mobile station and at least one lock open password calculation device, wherein a first activity of the mobile station in the system is activated upon a successful completion of a lock opening procedure, wherein said first activity if comprised of a change of a right of use of at least one second activity in the mobile station, wherein in said system said lock open password calculation device calculates a lock open password ($C_1$) to be entered into the mobile station and compared in the mobile station with a predefined comparative password ($C_2$), a change of dependence being implemented on the basis of the result of said comparison, and wherein at least two predefined codes and an algorithm (Y) are pre-stored in a memory that is accessible to the mobile station at least for read access, without being transferred over the air from a telecommunication network, and stored as well in the lock open password calculation device, the comparative password ($C_2$) being calculated in the mobile station and the lock open password ($C_1$) being calculated in the lock open password calculation device by the algorithm (Y) on the basis of said at least two predefined codes.

18. A system in accordance with claim 17, and further comprising a code table ($T_2$) that is also stored in the mobile station and in the lock open password calculation device, the comparative password ($C_2$) being calculated in the mobile station and the lock open password ($C_1$) being calculated in the lock open password calculation device by said algorithm (Y) also on the basis of code table ($T_2$).

19. A system in accordance with claim 18, wherein said lock open password ($C_1$) calculation device is comprised of a protection module for storing a protection code (P), memory means for storing a further code table ($T_3$), and means for calculating said code table ($T_2$) with an algorithm (Z) on the basis of said protection code (P) and said further code table ($T_3$).

* * * * *